(12) United States Patent
Pansier et al.

(10) Patent No.: US 8,614,902 B2
(45) Date of Patent: Dec. 24, 2013

(54) POWER FACTOR CORRECTION STAGE WITH AN ADJUSTABLE DELAY TIME

(75) Inventors: Frans Pansier, Nuenen (NL); Thomas Antonius Duerbaum, Baiersdorf (DE); Markus Schmid, Jettingen-Scheppach (DE); Klaus Mühlbauer, Friedenfels (DE); Johann Baptist Daniel Kuebrich, Schlüsselfeld (DE)

(73) Assignee: NXP B.V., Eindhoven (NL)

(*) Notice: Subject to any disclaimer, the term of this patent is extended or adjusted under 35 U.S.C. 154(b) by 411 days.

(21) Appl. No.: 12/981,128

(22) Filed: Dec. 29, 2010

(65) Prior Publication Data

US 2011/0188273 A1 Aug. 4, 2011

(30) Foreign Application Priority Data

Dec. 31, 2009 (EP) .................................. 09252935

(51) Int. Cl.
*H02M 7/217* (2006.01)

(52) U.S. Cl.
USPC ............................... 363/89; 363/65; 323/272

(58) Field of Classification Search
USPC ................ 323/207, 272; 363/65, 89
See application file for complete search history.

(56) References Cited

U.S. PATENT DOCUMENTS

| 4,384,321 | A | 5/1983 | Rippel | |
|---|---|---|---|---|
| 5,278,489 | A | 1/1994 | Bowers | |
| 7,116,087 | B2* | 10/2006 | Zhang et al. | 323/272 |
| 8,098,505 | B1* | 1/2012 | Choi | 363/89 |
| 8,120,340 | B2* | 2/2012 | Chen et al. | 323/272 |
| 8,125,203 | B2* | 2/2012 | Ayukawa et al. | 323/272 |
| 8,248,041 | B2* | 8/2012 | Rausch et al. | 323/272 |
| 8,373,399 | B2* | 2/2013 | Yang et al. | 323/272 |
| 2006/0238179 | A1 | 10/2006 | Harris et al. | |
| 2007/0253223 | A1 | 11/2007 | Neidorff et al. | |
| 2008/0225560 | A1 | 9/2008 | Yang et al. | |
| 2008/0316783 | A1* | 12/2008 | O'Loughlin | 363/124 |
| 2009/0206809 | A1* | 8/2009 | Koo et al. | 323/282 |
| 2009/0257257 | A1 | 10/2009 | Adragna et al. | |
| 2009/0267658 | A1* | 10/2009 | Bridge et al. | 327/141 |
| 2010/0244789 | A1* | 9/2010 | Osaka | 323/271 |
| 2011/0188273 | A1* | 8/2011 | Pansier et al. | 363/44 |
| 2012/0187929 | A1* | 7/2012 | Ohshita et al. | 323/272 |

OTHER PUBLICATIONS

Partial European Search Report for European Patent Appln. No. 09252935.3 (Jun. 10, 2010).
M. Albach et al.; "Optimized Operation Mode for 3 kW Off-Line Preconditioner Circuits"; 4th European Power Electronics Conference EPE, Florenz, Italy, vol. 3, p. 134-139; 1991.
M. Albach; "Conducted Interference Voltage of AC-DC converters"; IEEE Power Electronics Specialists Conference PESC, Vancouver, Canada, p. 203-212); 1986.

\* cited by examiner

*Primary Examiner* — Jeffrey Sterrett (57) ABSTRACT

A power factor correction stage comprising: an input terminal configured to receive an input signal; an output terminal configured to provide an output signal; a first converter stage and one or more further converter stages, wherein each of the converter stages is connected to the input terminal and the output terminal, and each converter stage comprises a switch; and a controller configured to operate the switches of the converter stages. The controller is configured to operate the switch of the one or more further converter stages at a period of time after operation of the switch of the first converter stage for a current switching cycle, wherein the period of time corresponds to a proportion of the switching frequency for an earlier switching cycle that does not correspond to substantially the period of the earlier switching cycle divided by the number of converter stages.

15 Claims, 4 Drawing Sheets

POWER FACTOR CORRECTION STAGE WITH AN ADJUSTABLE DELAY TIME

This application claims the priority under 35 U.S.C. §119 of European patent application no. 09252935.3, filed on Dec. 31, 2009, the contents of which are incorporated by reference herein.

FIELD OF THE INVENTION

The present disclosure relates to the field of power factor correction stages, and particularly, although not exclusively, interleaved power factor correction (PFC) stages.

BACKGROUND OF THE INVENTION

It is known to use a power factor correction (PFC) stage in devices that receive a mains voltage. Such a PFC can be used in order to comply with requirements of harmonic currents drawn from a single or three phase power supply.

It is known to use two interleaved boost converters, whereby the switch of the second boost converter is operated by a control signal which is 180° out of phase with a control signal that is used to operate the switch of the first boost converter.

Known converters may require a large electromagnetic interference (EMI) filter, which can consist of differential and common mode chokes and capacitors, in order to ensure that the EMI generated by the PFC is kept below certain values. There may also be power limitations associated with known PFC's, when they are used with high power devices such as servers.

The listing or discussion of a prior-published document or any background in the specification should not necessarily be taken as an acknowledgement that the document or background is part of the state of the art or is common general knowledge.

SUMMARY OF THE INVENTION

According to a first aspect of the invention, there is provided a power factor correction stage comprising:
an input terminal configured to receive an input signal;
an output terminal configured to provide an output signal;
a first converter stage and one or more further converter stages, wherein each of the converter stages is connected to the input terminal and the output terminal, and each converter stage comprises a switch; and
a controller configured to operate the switches of the converter stages;
wherein the controller is configured to operate the switch of the one or more further converter stages at a period of time after operation of the switch of the first converter stage for a current switching cycle, wherein the period of time corresponds to a proportion of the switching frequency for an earlier switching cycle that does not correspond to substantially the period of the earlier switching cycle divided by the number of converter stages.

It has been found that operating the switch of the one or more further converter stages in this way can provide improved performance over power factor correction stages/switched mode power supplies (SMPS's) where the switches of the converter stages are operated at instances of time corresponding to equal divisions of a switching frequency. The improvement in performance can be in terms of an increased efficiency and/or decreased EMI emissions. A decrease in EMI emissions can, in turn, lead to a reduction in the requirements of an EMI filter thereby decreasing the number of components and/or physical size required for a power factor correction stage/SMPS and associated circuitry.

It will be appreciated that the functionality of the controller may be provided by a single component/module, or may be distributed over a number of components/modules.

Using a period of time that varies by 1%, 2%, 3%, 5%, 10% or more, from the period of the earlier switching cycle divided by the number of converter stages may be considered as not substantially corresponding to the period of the earlier switching cycle divided by the number of converter stages. In some embodiments, the period of time may comprise a value that is outside of any tolerance values of systems that use a time period corresponding to the period of the earlier switching cycle divided by the number of converter stages The controller may be configured to operate the switch of the one or more further converter stages at a period of time after operation of the switch of the first converter stage for a current switching cycle based on:
a fixed internal setting of the period of time value in the controller;
an modification of the fixed internal setting of the period of time value in the controller in accordance with user input (user input can be provided by adjusting the value of an external fixed or variable resistor or an external fixed or variable capacitor, for example);
a value in a look-up table in accordance with one or more parameter values.

In this way, the controller can operate the switch in accordance with a fixed internal setting of the period of time value in the controller, for example as determined by a computer simulation of the power factor correction stage. Additionally, in some embodiments, the fixed internal setting could be modified by a user in order to further improve the performance of the power factor correction stage. For example, to account for any variations in component values when compared to the component values that were used for the simulation.

In some examples, the controller can apply a time delay corresponding to a value in a look-up table in accordance with one or more parameter values. In this way, the controller may be capable of adjusting the period of time on-the-fly/dynamically whilst the power factor correction stage is in-use. As an example, the one or more parameter values could be an input voltage and/or an output voltage, and the controller can be configured to use a look-up table to determine a period of time between switching operations based on the one or more parameter values (input/output voltage). The controller may be configured to calculate the required switch "on-time" for the first converter, and adjust the delay according the corresponding values in the look-up table.

A look-up table can be used to look up a value for the period of time in accordance with the active phase, as in some embodiments, the optimum delay can depend on the number of phases.

A look-up table could be used to look up a value for the period of time in accordance with the rms ac input voltage. In the US, the regulation starts at 450 kHz while in Europe the regulation starts at 150 kHz. Therefore, adaptation of the period of time for different jurisdictions/regulations can be useful, and can be performed using a look-up table.

The controller may be configured to operate the first converter stage in a variable switching frequency mode of operation, which may be a boundary conduction mode of operation. In some examples, the controller may be configured to operate the first converter stage in a fixed switching frequency mode of operation such that the fixed switching frequency is either periodically or randomly adjusted. Such examples can be advantageous in terms of a requirement for EMI filtering (see M. Albach, (1986) *Conducted interference voltage of ac-dc converters* IEEE Power Electronics Specialists Conference PESC, Vancouver, Canada, p. 203-212). Such a mode of operation may still be referred to as a fixed frequency mode of operation since the applied control resembles that of fixed frequency PWM operation.

The converter stages may comprise boost converters.

The controller may be configured to operate the switch of the first converter stage in accordance with a required output level. That is, the "time-on" value of the switch and/or the switching frequency and/or any other characteristic of the power factor correction stage/SMPS may be automatically controlled by the controller in order to provide a required output signal level.

The first converter stage and one or more further converter stages may be interleaved converter stages.

There may be provided a controller for a power factor correction stage/SMPS, the controller being configured to deactivate one or more of the converter stages if a required output level falls below a threshold value. Deactivating a converter stage may comprise not sending a control signal to operate a switch of the converter stage. Deactivating a converter stage can improve the performance of the power factor correction stage/SMPS as each of the "activated" converter stages operating at a first power level can be more efficient than all of the converter stages operating at a second, lower, power level.

The converter stages may be configured for performance (such as maximum efficiency or other optimal/preferred performance) at specific power output levels. The controller may be configured to deactivate a specific one or more of the converter stages in accordance with a comparison between a required output level and the performance of the converter stages at specific power levels. The specific power output levels may be different for different converter stages of the power factor correction stage/SMPS.

The switched mode power supply may further comprise an electromagnetic interference (EMI) filter. In some embodiments, the requirements of the EMI filter can be reduced when compared with the prior art, which can lead to a saving in terms of physical volume occupied by the EMI filter and efficiency of operation.

There may be provided a switched mode power supply comprising any power factor correction stage disclosed herein.

The switched mode power supply may further comprise an electromagnetic interference filter.

There may be provided an integrated circuit comprising the control functionality of any power factor correction stage disclosed herein, or any switched mode power supply disclosed herein.

According to a further aspect of the invention, there is provided a method of operating an interleaved power factor correction stage, the method comprising:
operating a switch of a first converter stage; and
operating a switch of one or more further converter stages at a period of time after operation of the switch of the first converter, wherein the period of time corresponds to a proportion of the switching frequency for an earlier switching cycle that does not correspond to substantially the period of the earlier switching cycle divided by the number of converter stages.

Operating the switch of the first converter stage may comprise:
operating the switch of the first converter stage such that the combined output of the first converter stage and the one or more further converter stages provides a required output level.

There may be provided a method of operating an interleaved power factor correction circuit comprising: deactivating one or more of the further converter stages if a required output level falls below a threshold value.

According to a further aspect of the invention there is provided a method of designing an interleaved power factor correction circuit, comprising:
applying one or more test signals to the power factor correction circuit with different time periods between switching operations of the interleaved converter stages, wherein the different time periods correspond to different proportions of an earlier switching cycle;
performing a spectral analysis of the performance of the power factor correction circuit;
identifying a period of time that provides an acceptable level of disturbance in the spectral analysis.

The method may be performed by computer simulation or by measurement of the performance of a hardware prototype/circuit.

The method may further comprise applying the identified period of time to a controller of a power factor correction circuit.

Applying the one or more test signals to the power factor correction circuit may comprise applying the one or more test signals to the power factor correction circuit for at least a period of time corresponding to a half wave of a received AC (such as a mains) signal or rectified AC signal. In examples where measurements are taken of a hardware prototype/circuit, the test signal (delay value) can be applied for sufficient time that the measurement can be completed.

Identifying the period of time that provides an acceptable level of disturbance in the spectral analysis may comprise identifying a period of time that provides a minimum level of disturbance. A level of disturbance may be considered as EMI emissions that are generated by the power factor correction circuit, and that may require removal by an EMI filter in order to satisfy regulations such as EN55013/EN55020/FCC47 part 2,15.

Identifying the period of time that provides an acceptable level of disturbance in the spectral analysis can comprise performing a determination of the minimum requirements of an EMI filter.

The method may further comprise identifying a period of time that provides an acceptable level of disturbance in the spectral analysis based on one or more performance characteristics of the power factor correction stage during an earlier switching cycle.

There may be provided a method of operating an interleaved power factor correction circuit comprising performing a method of designing a power correction circuit as disclosed herein, and operating the switches of the interleaved power factor correction circuit in accordance with the identified period of time.

The power factor correction circuit may be configured to operate in a variable switching frequency mode of operation such as boundary conduction mode (BCM).

An SMPS may comprise any power factor correction stage/circuit (PFC) disclosed herein, and the converter stages may comprise power factor correction stages. The SMPS may be a DC to DC converter or an AC to DC converter. The converter stages may comprise boost converters, buck converters, buck-boost converters, sepic converters, zeta converters, cuk converters, flyback converters, and/or forward converters, as non-limiting examples.

There may be provided a personal computer, television, monitor, or any other electrical device comprising any power factor correction stage or switched mode power supply or integrated circuit disclosed herein.

There may be provided a computer program, which when run on a computer, causes the computer to configure any apparatus, including a power factor correction stage, switched mode power supply, integrated circuit, circuit, system, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium such as a disc or a memory device, or may be embodied as a transient signal. Such a transient signal may be a network download, including an internet download.

BRIEF DESCRIPTION OF THE DRAWINGS

A description is now given, by way of example only, with reference to the accompanying drawings, in which.

DETAILED DESCRIPTION OF EMBODIMENTS

One or more embodiments described herein relate to an interleaved boost converter, which can comprise two or more boost converters in parallel, whereby the switch of the second (and any subsequent) boost converters is operated at a period of time after operation of the switch of the first converter stage for a current switching cycle, wherein the period of time corresponds to a proportion of the switching frequency for an earlier switching cycle that does not correspond to substantially the period of the earlier switching cycle divided by the number of converter stages.

One or more embodiments described herein are based on the finding that the performance of an interleaved power factor correction (PFC) circuit can be improved by utilising a dynamically adjustable delay time between the operation of switches in the interleaved PFC circuit in accordance with an earlier switching cycle. For example, the performance can be improved in terms of efficiency, and/or a decrease in the amount of electromagnetic interference (EMI) that is generated by operation of the interleaved PFC circuit. This can lead to a reduction in the size of an EMI filter that is required, and size reductions can be particularly important for personal computers, for example.

In order to comply with requirements of harmonic currents that are drawn from a single phase line, such as a mains voltage supply, it is known for a power factor correction (PFC) stage to be used. The PFC stage can be active, passive, or a single stage. An active PFC stage is typically used for medium and high power applications, and a single boost PFC is typically used for the power ranges that are required for television sets and monitors, as well as desktop personal computers (PC's). In such examples, the single boost PFC stage can be used in boundary conduction mode (BCM) utilising a variable switching frequency, whereby the conductor current of the PFC starts from zero for every switching cycle, reaches twice the required average current, and then falls down to zero again to start the next switching cycle.

Figure 1:
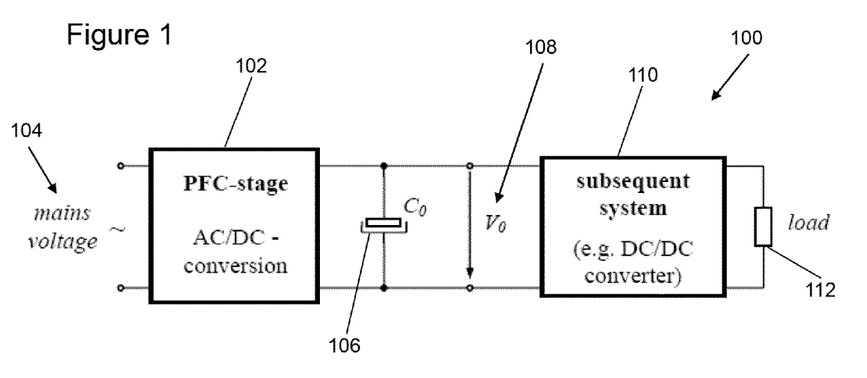
FIG. 1 illustrates a block diagram of a power conversion system.

FIG. 1 illustrates schematically a block diagram of a power conversion system 100 comprising a power factor correction stage 102.

The power factor correction circuit 100 of FIG. 1 consists of a PFC stage 102, which receives a mains voltage 104. A capacitor 106 is connected across the outputs of the PFC stage 102, such that the smoothed output of the PFC stage 102 is provided as an input voltage 108 to a subsequent system 110 such as a DC/DC converter. The output of the DC/DC converter 110 is connected to a load 112.

The PFC stage 102 can incorporate an input filter, a rectifier and a boost cell. It is known in the art for the boost cell and input filter to occupy a similar amount of space. The filter can consist of differential and common mode filter components whereby the differential filter components can be selected based on the specific topology and operation mode, and the common mode filter components can be determined by the layout and parasitic capacitances of the boost cell.

Figure 2:
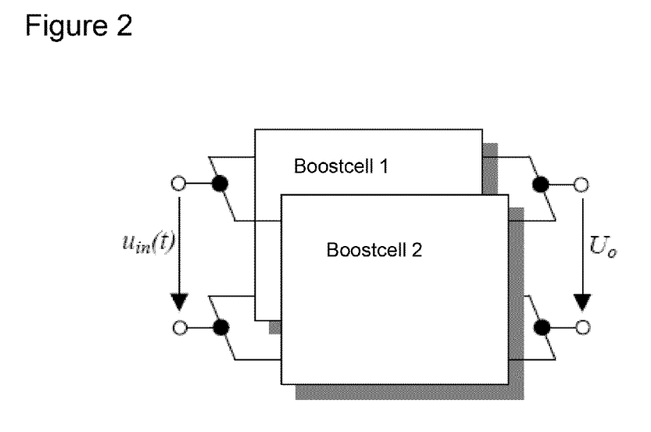
FIG. 2 illustrates a block diagram of two parallel interleaved boost converters.

FIG. 2 shows two boost cells provided in parallel in order to increase the efficiency of the PFC stage. At a certain power level, a single boost with one switching element is no longer able to operate efficiently. A first idea to increase efficiency is by decreasing the on-resistance of the active switch due to paralleling of MOSFETs. However, the parallel approach can have limitations when the resistance values drop as low as a few tens of Ohms, as the extra tracks can be responsible for a similar resistance to that of the channel between the drain and source of the MOSFET's, and therefore an overall improvement may not be achieved. Thus a further idea is to parallel complete boost converter cells comprising at least an inductor, an active switch and a diode.

It is known to use interleaved boost cells as shown in FIG. 2 in DC/DC load converters, and also in AC/DC PFC converters in order to increase the power range that can be handled by the PFC stage 102, for example any MOSFET devices that are present in the PFC stage 102.

M. Albach et al, (M. Albach, D. Dambois, (1991) *Optimized operation mode for 3 kW off-line preconditioner circuits* 4th European Power Electronics Conference EPE, Florenz, Italy, vol. 3, p. 134-139) discloses a 3 kW fixed frequency PFC consisting of two 1.5 kW boost cells working at a frequency of 200 kHz, with a phase shift of 180° between switching operations of the two boost cells. It will be appreciated that a 180° phase shift provides a time delay between the switching of the two boost cells by a period of time that is equal to half the switching period.

It is also known in the art to apply a delay corresponding to a phase of 180° for interleaved boost converters operating in a variable frequency boundary conduction mode (BCM) of operation, as used by Texas Instruments in the BCM interleaved controller UCC28060 ("Natural Interleaving™ DUAL-PHASE TRANSITION-MODE PFC CONTROLLER").

Figure 3:
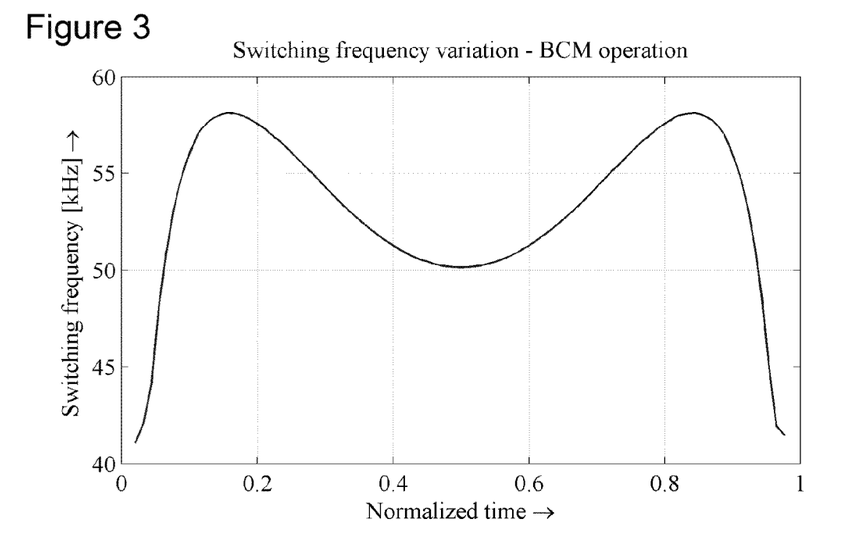
FIG. 3 illustrates graphically a variation in switching frequency for a prior art power factor correction circuit operating in BCM.

FIG. 3 illustrates graphically how the switching frequency for a prior art boost converter operating in BCM varies over a period of time corresponding to 180° of a mains cycle. The time on the horizontal axis shown in FIG. 3 has been normalised for ease of illustration, and in Europe corresponds to 10 ms (based on a mains frequency of 50 Hz). It can be seen that the switching frequency varies over the mains cycle.

Figure 4:
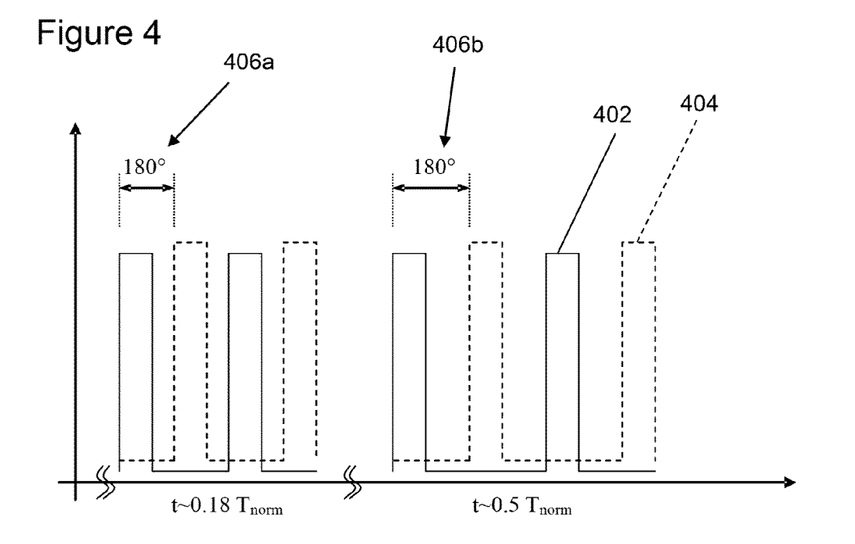
FIG. 4 illustrates graphically operation of a prior art switched mode power supply.

FIG. 4 illustrates graphically control signals that can be provided to two switches of the prior art boost converters operating in BCM. The control signals illustrated in FIG. 4 correspond to the operation of the prior art boost converters over 180° of a mains cycle as shown in FIG. 3.

The control signal that is provided to the first boost converter is shown with reference 402 in FIG. 4, and the control signal for the second boost converter is shown with reference 404. For ease of illustration, the amplitude of the control signals are normalised, and the control signal 404 for the second boost converter is shifted by a small amount.

For ease of illustration, the control signals of FIG. 4 are shown at two time instants within the mains half cycle, and it can be seen that the absolute value for the delays represents the same proportion of the period of the switching cycle that is 180° of the switching cycle. In this example, the absolute delay 406a is shorter for a higher switching frequency (at around 0.18 normalised time of FIG. 3) than for the delay 406b for the lower switching frequency at the centre of the mains cycle (0.5 normalised time as shown in FIG. 3).

FIGS. 3 and 4 illustrate that, for prior art interleaved boost converters operating in BCM, the absolute value for the delay between operation of switches changes in accordance with the instantaneous switching frequency of the converters in order to maintain a fixed phase relationship between the operation of the switches.

Figure 5:
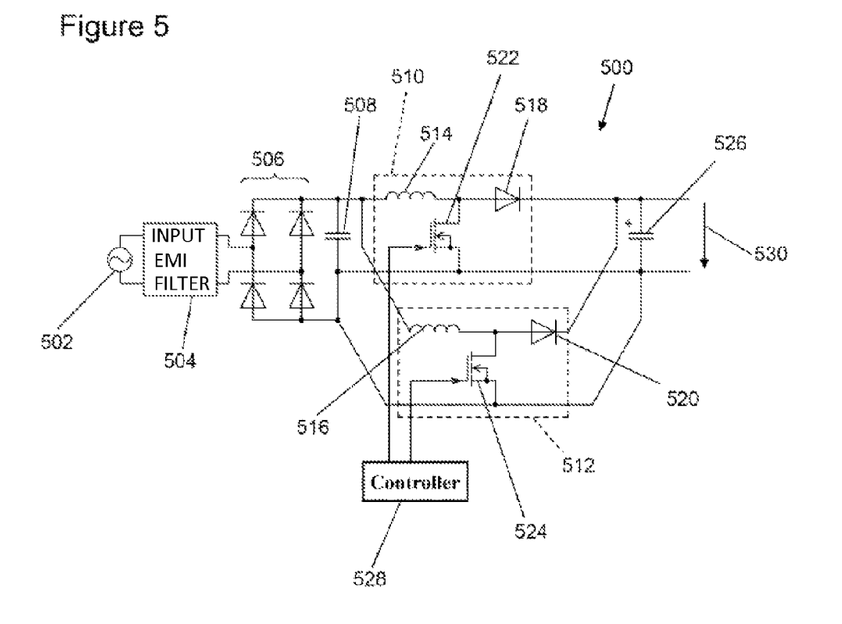
FIG. 5 illustrates a switched mode power supply according to an embodiment of the invention.

FIG. 5 illustrates a switched mode power supply (SMPS) 500 according to an embodiment of the invention.

The SMPS 500 includes a mains input voltage supply 502, that is provided to an input EMI filter 504. The input filter is configured to reduce the EMI radiation of the SMPS 500. The outputs of the input filter 504 are provided to a bridge rectifier 506. A high frequency capacitor 508 is connected between the outputs of the bridge rectifier 506.

Also connected to the outputs of the bridge rectifier 506 are a first boost converter 510 and a second boost converter 512. The first and second boost converters 510, 512 are connected to the outputs of the bridge rectifier 506 in parallel, and such a configuration is known as interleaving boost converters.

The outputs of the first and second boost converters 510, 512 are connected together to provide a common output 530, and an output smoothing capacitor 526 is also coupled between the outputs of the SMPS 500.

As is known in the art, each boost converter 510, 512 comprises an inductor 514, 516 and a diode 518, 520 connected in series between the positive input to the boost converter and the positive output of the boost converter. Also provided as part of the boost converter 510, 512 is a switch, which in this example is a metal oxide semiconductor field effect transistor (MOSFET) 522, 524. The channels of the MOSFET's 522, 524 are connected between the ground rail of the boost converters 510, 512 and the positive rail at a junction between the inductor 514, 516 and the diode 518, 520. The MOSFET's 522, 524 are operated by a controller 528 through the provision of a voltage to the gate of the MOSFET. One or more embodiments of the invention disclosed herein can be considered as being provided by a novel and inventive controller 528.

In this example, the controller 528 is configured to operate the first boost converter 510 in a boundary conduction mode (BCM) of operation, which results in a variable switching frequency in order to provide the required output level. In other examples discontinuous conduction mode (DCM) or continuous conduction mode (CCM) can be used.

In some embodiments, BCM can be considered as more advantageous than DCM or CCM in terms of efficiency and/or EMI emissions. Further advantages associated with BCM can be achieved by operating the first boost converter 510 and/or second boost converter 512 in BCM with valley skipping or valley switching.

The controller 528 is configured to implement a delay between operating the switch 522 of the first boost converter 510 and operating the second switch 524 of the second boost converter 512 in accordance with the period of an earlier switching cycle. In this embodiment, a delay corresponding to a proportion of the previous switching cycle may be used. Such an embodiment can be considered as easy to implement as the first boost converter 510 can be controlled such that its "time-on" value is set in accordance with a desired output voltage, and the second boost converter 512 can be controlled to follow the operation of the first boost converter 510 with a programmed delay in accordance with an earlier switching cycle. In this way, the first boost converter 510 may be considered as a master boost cell, and the second boost converter 512 may be considered as a slave boost cell.

In some embodiments, the controller may be configured to estimate the period of a current switching cycle and determine the period of time that is to be used between operation of the switches of the converter stages using the estimated period of the current switching cycle.

One or more embodiments disclosed herein can be considered as introducing a dynamically adjustable delay time between operation of switches in an interleaved power factor correction stage/circuit. Such embodiments can allow a further reduction in inductance values that are required by components of the power factor correction stage/filter/switched mode power supply.

The controller is configured to apply a delay of a period of time after the operation of the switch of the first converter stage for a current switching cycle before the switches of the other converter stages are operated. In this example, the period of time corresponds to a proportion of the switching frequency for an earlier switching cycle that does not correspond to substantially the period of the earlier switching cycle divided by the number of converter stages. For the example of FIG. 5, the delay does not correspond to the switching period of the previous switching cycle divide by 2. More generally, the time delay does not substantially equal $T_{previous\_switching\_cycle}/n$, where n is the number of interleaved converter stages.

According to embodiments of the invention that have more than two interleaved converter stages, the phases of the switching signals for each of the interleaved converter stages would all have a phase shift relative to each other corresponding to a determined/optimum period of time $\Delta t$. That is, the switching signal for the first converter stage starts at $t=0$, the switching signal for the second converter stage starts at $t=\Delta t$, the switching signal for the third converter stage starts at $t=2\Delta t$, etc.

Embodiments of the invention can relate to the design of an interleaved power factor correction circuit (PFC), and more specifically to the design of the controller for a PFC, whereby the controller is configured to apply a time delay between switching operations that is not known from the prior art.

The design of the PFC can be performed by a computer simulation of a PFC circuit, and can involve applying one or more test signals to the power factor correction circuit with different time periods between switching operations of the interleaved converter stages, wherein the different time periods correspond to different proportions of an earlier switching cycle. The method of design can then include performing a spectral analysis of the performance of the power factor correction circuit according to a regulation/standard such as EN55013. The spectral analysis can include an analysis of residual high frequency currents that the PFC draws from a mains supply. This can result is a level for each frequency band, and can provide an indication of the required level of suppression in the EMI filter. Standards such as EN55013 can identify acceptable levels.

A first example of spectral analysis includes performing a calculation or measurement of the waveform with a high enough time resolution (adapted to the desired upper frequency of the spectrum desired). A second example includes performing a mathematical, symbolic calculation of the Fourier Integral for each segment of the waveforms.

Following the results of the spectral analysis, a period of time that provides an acceptable level of disturbance in the spectral analysis can be identified/determined. An example of an acceptable level of disturbance is one that requires minimum inductance values as part of an associated EMI filter, whilst still being able to satisfy any regulations. This can enable the EMI filter components to be kept to reduced/minimum values, which in turn can reduce the physical volume and cost of the EMI filter, which can be a major design concern in some applications.

It has been found, by performing the above method of designing a PFC, that a period of time that does not correspond to substantially the period of the earlier switching cycle divided by the number of converter stages provides an improved performance.

Figure 6:
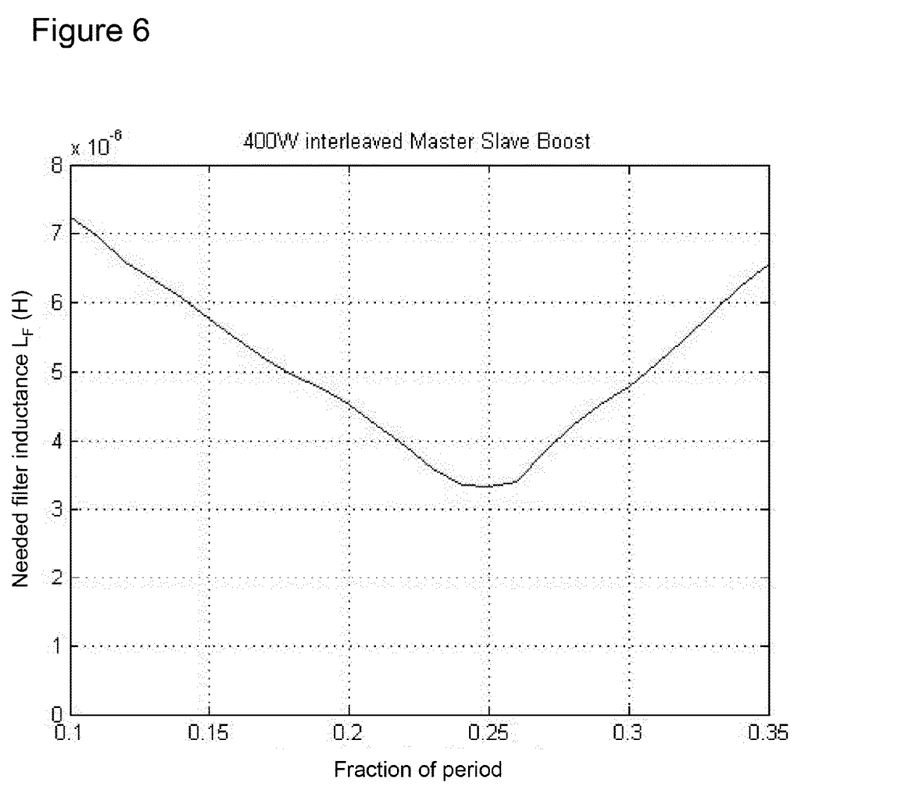
FIG. 6 illustrates graphically the minimum inductance that is required to satisfy EMI requirements for operation of a switched mode power supply with different dynamic shifts.

FIG. 6 illustrates the results of spectral analysis performed on a PFC, and illustrates a minimum inductance that is required as part of the input filter 504 for different delays corresponding to different proportions of the switching frequency. The minimum inductance is shown on the vertical axis, and the proportion of the switching frequency that is used to calculate the delay time between switch operations is shown on the horizontal axis, in this example ranging between 0.1 and 0.35 of the switching frequency. The results that are illustrated in FIG. 6 were obtained by performing an experiment on two 200 W interleaved boost converters, and it will be appreciated that similar results can be obtained for boost converters having different power ratings, and/or a different number of boost converters.

For the example shown in FIG. 6, it can be seen that a delay time representative of 0.25 times the switching frequency period enables the smallest inductor to be used whilst providing satisfactory EMI emissions.

In this example, the filter inductances that are shown in FIG. 6 are calculated by neglecting the bandwidth of the measurement set-up to measure EMI disturbances according to a regulation, and therefore the determined values may be too small. Nevertheless the result remains correct, and the optimum delay for this example will be of the order of 0.25 times the switching period in order to fulfil the final measurement with the correct bandwidth.

In some examples, it can be convenient to base the delay time for a present switching cycle on the results for a previous switching cycle, such as the immediately previous switching cycle. In some embodiments, it will be appreciated that the switching cycle changes sufficiently slowly for adequate performance to still be achieved.

One embodiment for implementing the required delay time of 0.25 times the switching frequency can be to charge a capacitor with a current value $I_O$ to obtain a measure for the previous switching period, and then discharge the capacitor with a value of $4*I_O$ to generate the 0.25 T time delay. Such an example timer is shown as FIG. 7. It will be appreciated that different designs will be required to provide different time delays.

Figure 7:
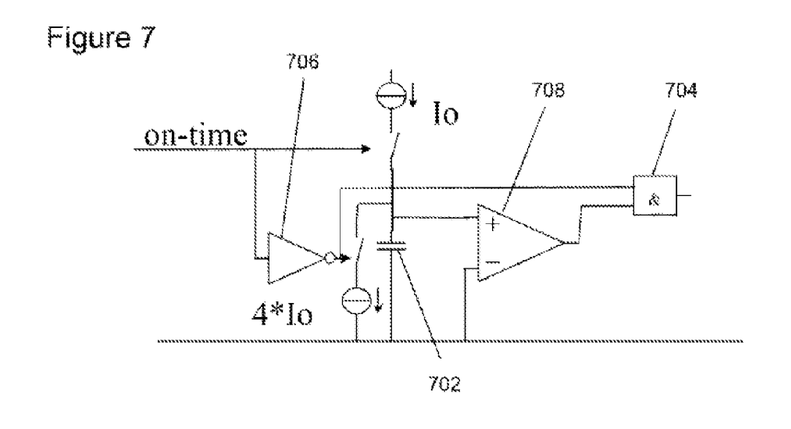
FIG. 7 illustrates an example timer that can be used with embodiments of the invention.

Operation of the timer circuit of FIG. 7 will now be described. At the start of the switch "on-time", the capacitor 702 is charged, and the output of the AND gate 704 is zero. At the expiry of the switch on-time period, the output of the inverter 706 becomes high, and the capacitor 702 will be discharged to zero again. During this time, the output of the comparator 708 is high, and therefore the output of the AND gate 704 is also high. As soon the capacitor 702 is completely discharged (which will take a quarter of the switch "on-time"), the output of the AND gate 704 becomes low again, and this transition will be the start of the on-time of the switch of the second converter.

In some embodiments, it will be appreciated that the required delay could also be implemented in a digital way.

Also, in some examples, the total cycle time duration of the first converter can be used instead of the switch on-time.

The implementation of the timer may be provided as a fixed program into an integrated circuit (IC).

One or more embodiments disclosed herein relate to the idea that the size of an input filter 504 can be reduced, when compared with the prior art, by introducing a time delay between operation of the individual switches of an interleaved boost converter that corresponds to a proportion of an earlier switching cycle that does not substantially correspond to $1/(f_s*n)$. It will be appreciated that the principles that are described and illustrated with reference to an interleaved boost converter with two boost converters, can be extended to any number of parallel boost converters, or indeed any number of any type of converter. Different types of converters that can be used with embodiments of the invention include buck converters, buck-boost converters, sepic converters, zeta converters, cuk converters, flyback converters, and/or forward converters.

There may be provided an interleaved PFC according to embodiments of the invention, whereby the controller is configured to effectively deactivate one or more PFC stages, such as boost cells, (for example by not providing a control signal to the switch of the boost cell) in accordance with the required output power level of the switched mode power supply. For example, the controller can determine the required output power by detecting an operational parameter value of the SMPS such as one or more of the "time-on" property of the switch, a "time-off" property of the switch, and/or a peak current value through the inductor or transistor/switch, as non-limiting examples. When it is determined that the SMPS is operating at part-load, for example the required output power is less than a threshold value, the controller may be configured to deactivate one or more of the boost cells. Such embodiments can lead to an improved efficiency of the SMPS because in some embodiments, operating a plurality of boost cells at part-load can be less efficient than operating fewer boost cells.

In some embodiments, the controller can be configured to change which of the boost cells are deactivated over time, for example by alternating the use of two boost cells. This can lead to a decrease in the thermal stress experienced by each of the boost cells, thereby leading to an improved lifetime of the components, for example.

In other examples, the plurality of boost cells can be configured such that they have an optimum efficiency at different output power levels. For example, two boost cells can have respective optimum efficiencies at 25% and 50% of the maximum output power. In such examples, a single boost cell can be used (and the other boost cell deactivated) if the total output power is 25% or 50% of the rated power, and both boost converters can be used together if the total output power is 75% of the rated power, or greater. Such embodiments can take advantage of local efficiency maximums that occur at specific total output power ratings.

It will be appreciated that one or more embodiments disclosed herein that relate to deactivating a PFC stage do not necessarily require the functionality of applying a delay between switching operations as required by other embodiments disclosed herein.

One or more embodiments disclosed herein may be suitable for use in any application that uses a power factor correction (PFC) circuit. For example, applications that have volume constraints such as in a personal computer (PC) or for a flat screen television/monitor where the power supply is located behind the panel, may particularly benefit from embodiments of the invention.

A specific application that is suitable for one or more embodiments of the invention is the PC market. Desktop PC's have requirements for efficiency (such as the 80plus program), and the server power supply market requires high power ratings and a need for high efficiency. The high efficiency may also be required over a wide load range, and embodiments that utilise the dynamic deactivation/switching-off of boost cells/phases can be particularly advantageous in such embodiments.

The invention claimed is:

1. A power factor correction stage comprising:
   an input terminal configured to receive an input signal;
   an output terminal configured to provide an output signal;
   a first converter stage and at least one further converter stage, wherein each converter stage is connected to the input terminal and the output terminal, and each converter stage comprises a switch; and
   a controller configured to operate the switch of the at least one converter stage;
   wherein the controller is configured to operate the switch of the at least one further converter stage at a period of time after operation of the switch of the first converter stage for a current switching cycle, wherein the period of time is not equal to a period of an earlier switching cycle divided by the number of converter stages.

2. The power factor correction stage of claim 1, wherein the controller is configured to operate the switch of the at least one converter stage at a period of time after operation of the switch of the first converter stage for a current switching cycle based on one of:
   a fixed internal setting of the period of time value in the controller;
   a modification of a fixed internal setting of the period of time value in the controller in accordance with user input; and
   a value in a look-up table in accordance with at least one parameter value.

3. The power factor correction stage of claim 1, wherein the controller is configured to operate the first converter stage in a variable switching frequency mode of operation.

4. The power factor correction stage of claim 3, wherein the controller is configured to operate the first converter stage in a boundary conduction mode of operation.

5. The power factor correction stage of claim 1, wherein the converter stages are boost converters.

6. The power factor correction stage of claim 1, wherein the first converter stage and at least one of the further converter stages are interleaved converter stages.

7. The power factor correction stage of claim 1, wherein the controller is configured to deactivate at least one of the converter stages if the required output level falls below a threshold value.

8. An integrated circuit comprising the control functionality of the power factor correction stage of claim 1.

9. A method of operating an interleaved power factor correction stage, the method comprising:
   operating a switch of a first converter stage; and
   operating a switch of at least one further converter stage at a period of time after operation of the switch of the first converter stage, wherein the period of time is not equal to a period of an earlier switching cycle divided by the number of converter stages.

10. The method of claim 9, wherein operating the switch of the first converter stage comprises:
    operating the switch of the first converter stage such that the combined output of the first converter stage and the at least one converter stage provides a required output level.

11. A method of designing an interleaved power factor correction circuit, comprising:
    applying at least one test signal to the power factor correction circuit with different time periods between switching operations of the interleaved converter stages, wherein the different time periods correspond to different proportions of an earlier switching cycle;
    performing a spectral analysis of the performance of the power factor correction circuit; and
    identifying a period of time that provides an acceptable level of disturbance in the spectral analysis;
    wherein the identified period of time is not equal to a period of the earlier switching cycle divided by the number of converter stages.

12. The method of claim 11, wherein the method is performed by computer simulation.

13. The method of claim 11, further comprising:
    applying the identified period of time to a controller of a power factor correction circuit.

14. The method of claim 11, wherein identifying a period of time that provides an acceptable level of disturbance in the spectral analysis comprises performing a determination of the minimum requirements of an associated EMI filter.

15. A method of operating an interleaved power factor correction circuit comprising:
    performing the method of designing a power correction circuit of claim 11; and
    operating the switches of the interleaved power factor correction circuit in accordance with the identified period of time.

* * * * *